INVENTORS.
SEYMOUR ZELNICK
ALFRED C. MONAGHAN

ATTORNEY

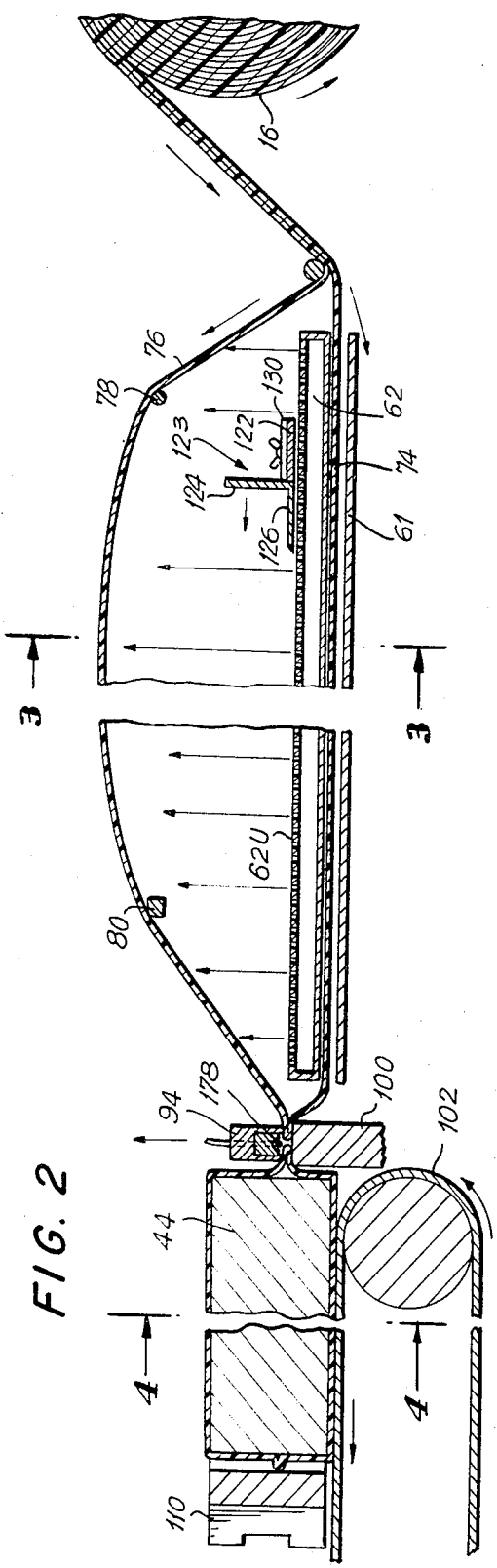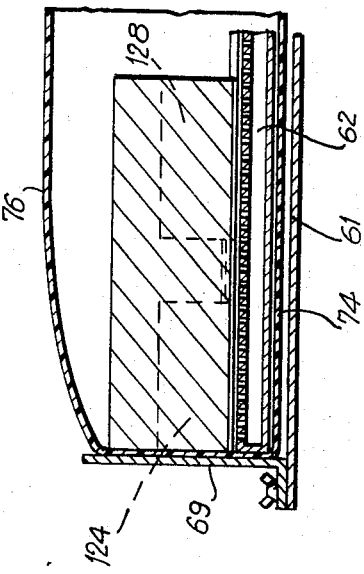
INVENTORS.
SEYMOUR ZELNICK
ALFRED C. MONAGHAN
ATTORNEY

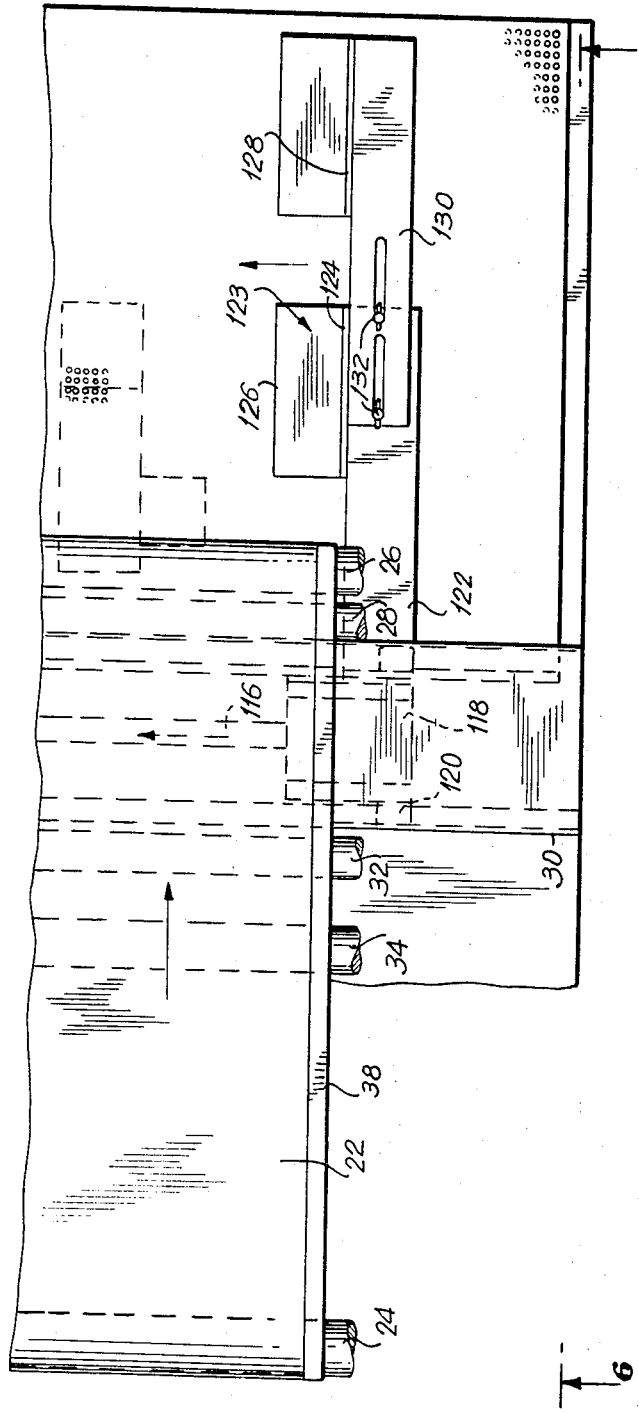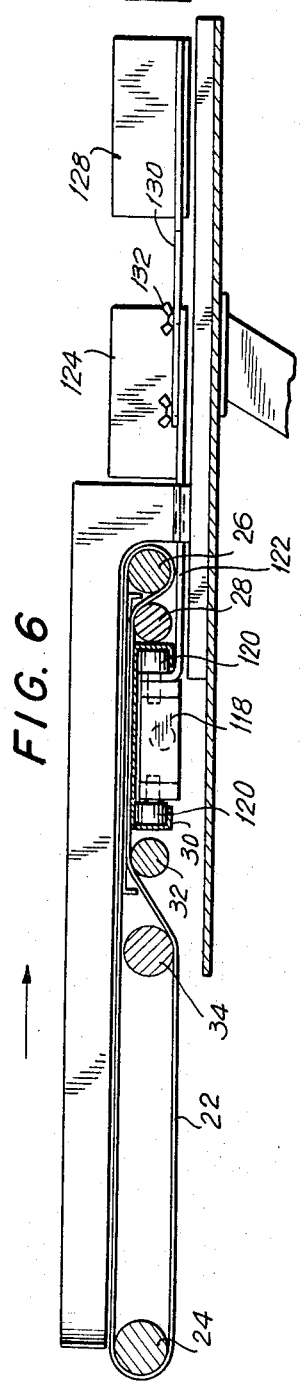

United States Patent Office 3,429,100
Patented Feb. 25, 1969

3,429,100
METHOD AND APPARATUS FOR SEALING FILM-WRAPPED PACKAGES
Seymour Zelnick, Orange, and Alfred C. Monaghan, Warren Township, Plainfield, N.J., assignors to Weldotron Corporation, Newark, N.J., a corporation of New Jersey
Filed July 12, 1966, Ser. No. 564,683
U.S. Cl. 53—182                                         8 Claims
Int. Cl. B65b 9/06, 51/30, 43/36

ABSTRACT OF THE DISCLOSURE

Apparatus is provided for wrapping articles automatically between upper and lower layers of heat shrinkable or nonshrinkable film, including means for feeding said film layers into article wrapping position, with the upper film layer spaced from the lower film layer by blowing gas against the inner surface of said upper film layer, and means for pushing the article between the spaced layers, after which the layers of film are sealed around the article and the wrapped article may be transmitted through means for shrinking the film around the article.

---

This invention relates to the enclosing of articles in a film, and more particularly, to a simple, fully automatic packaging machine for enclosing a wide variety of articles in thermoplastic films, which films may be of either the shrink or nonshrink variety.

The enclosing of articles between the two layers of a longitudinally folded web of thermoplastic film is well known, and is taught, for example, in U.S. Patent No. 3,047,991, issued to Martin Siegel on Aug. 7, 1962. As shown therein, the folded web of film is unwound from a supply roll, articles are sequentially inserted between the two layers of the web, the two layers are sealed together along the cross-web axis between successive articles, the two layers are sealed together along the machine axis adjacent the distal edges of the web, and each article and its sealed thereabout layers may be separated from the next successive article and its sealed thereabout layers. These last sealing and separation operations may be substantially concurrently performed by an L type impulse sealer, which clamps and melts the layers along the cross-web and machine axis.

These machines have been manually operated machines, particularly with respect to the insertion, in turn, of each article between the layers of the web of film. In such machines the upper layer of the web is raised from the lower layer and passed over one or more stationary guide fingers. When it is attempted to load such an arrangement automatically with relatively thick articles, e.g., over one inch high, by means of a cross-web axis conveyor belt, the articles tend to distort the layers, to drag the upper layer off the free ends of the guide fingers, and to fail to seat properly against the fold in the web.

Accordingly, it is an object of this invention to provide an arrangement wherein articles may be automatically, sequentially, and properly disposed between the layers of a folded web for sealing therein.

It is another object of this invention to provide an arrangement which is adapted to either fully automatic operation or to manual operation.

It is still another object of this invention to provide an arrangement which is adapted to the proper location of articles of different widths within a single web.

A feature of this invention is the provision of a gas flow directed upwardly against the inner surface of the upper layer of the folded over web, and the insertion of the article through the gas flow, so that the gas flows between the article and the upper layer of the web. This gas flow may be provided by a perforated air chamber which may serve as a loading platform for the articles, and which chamber extends between the layers of the folded over web of film, upstream of the sealing apparatus. Transporting means may be provided for automatically transporting the article and the web from the loading platform to the sealing apparatus.

These and other objects, features and advantages of this invention will become apparent upon consideration of the following specification taken in conjunction with the accompanying drawing in which:

FIG. 2 is a cross-sectional view in elevation of the apparatus taken along the plane 2—2 of FIG. 1;

FIG. 3 is a cross-sectional view in elevation of the apparatus taken along the plane 3—3 of FIG. 2;

FIG. 4 is a cross-sectional view in elevation of the apparatus taken along the plane 4—4 of FIG. 2;

FIG. 5 is a detailed view in plan of the cross-web feed portion of the apparatus of FIG. 1;

FIG. 6 is a cross-sectional view in elevation of the apparatus taken along the plane 6—6 of FIG. 5.

Figure 1:
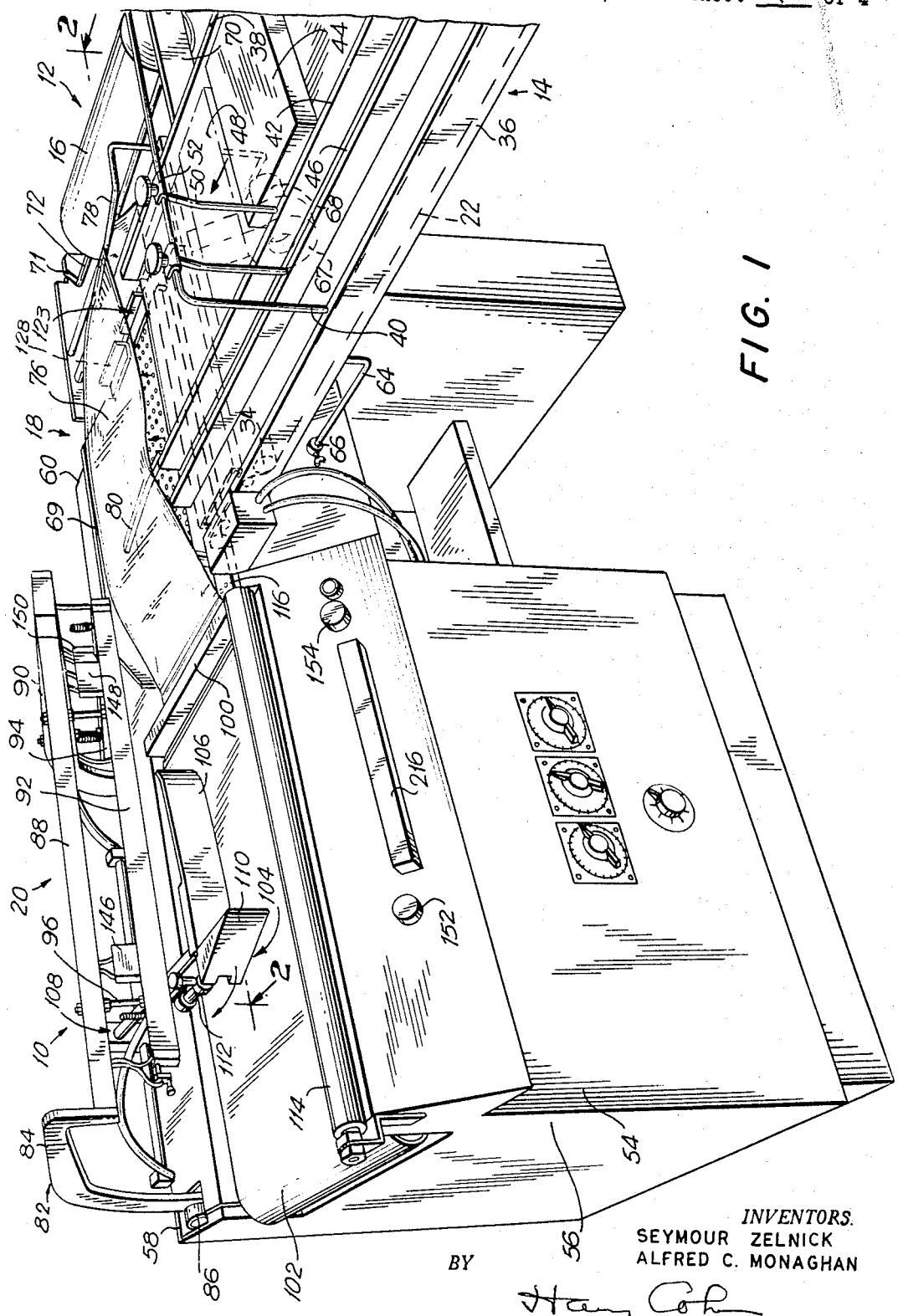
FIG. 1 is a view in perspective of an apparatus embodying this invention.

The preferred embodiment shown in FIG. 1 comprises an L sealer module 10, which is provided with a folded web of thermoplastic film for movement in the machine direction from a supply roll module 12; and which is provided with a series of articles by a cross-web axis infeed conveyor module 14. The supply roll module is shown as having a roll 16 of a prefolded web; however, it is within the scope of this invention to utilize a module which continually folds a web which is supplied from a roll of unfolded web.

The L sealer module includes, with respect to the machine direction, an upstream loading station 18 and a downstream sealing station 20. The cross-web axis conveyor module 14 includes an endless conveyor belt 22, whose upper run is flat for transporting articles and commences at an infeed roller 24 and terminates at an outfeed roller 26, and whose lower run passes over a guide roller 28, over a pusher assembly guide 30, over a guide roller 32, and under a guide roller 34. The belt may be tensioned and driven by suitable means, such as a motor 35. The rollers are supported by and between two side walls 36 and 38. The U shaped brackets 40 (only one shown in FIG. 1) extend over the conveyor belt between the side walls. One or more adjustable guide fences may be supported over the upper run of the conveyor belt from the brackets. Two fences are here shown, one fence 42 for guiding relatively high and narrow articles 44, and another fence 46 for guiding relatively low and wide articles 48. Each fence is supported by a rod 50 and a clamp 52 to the bracket 40. The underside of the fence 42 clears the upper surface of the upper run of the conveyor belt by a distance which is at least equal to the height of the article 48, but which is less than the height of the article 44. The underside of the fence 46 clears the upper surface of the upper run by a distance which is less than the height of the article 48.

Thus, the article 48 is guided between the fence 46 and the wall 38; and the article 44 is guided between the fence 42 and the wall 38.

The L sealer module 10 includes a console having a front panel 54, a left side panel 56, a rear panel 58, a right side panel 60, and a right top panel 61. A hollow panel 62 or tray having an internal plenum is supported by brackets 64 at a level beneath the outfeed end of the cross-web axis infeed conveyor 22 and above the right top panel 61. The brackets 64 are adjustably mounted to the front panel 54, as by sockets and thumbscrews 66, so that the tray 62 is adjustable along the cross-web axis with respect to its projection beyond the outfeed end of the conveyor 22. A centrifugal air blower 67 having a motor 68 is coupled to the tray 62 and provides a flow of air into the plenum. The upper surface 62U of the tray is uniformly perforated to permit the discharge of air flow, and to thereby provide an upward flow of air all over the upper surface. A back stop 69 is adjustably mounted to the right top panel 61 for movement along the cross-web axis towards and away from the outfeed end of the conveyor 22 to halt the advance of an article after it leaves the outfeed end of the conveyor and is disposed on the tray 62.

The supply roll module 12 includes a pair of arms 70 which are fixed to and project from the right side panel 60, and which have recesses 71 to guide the ends of a cross rod 72 which passes through and guides the supply roll 16 of the folded thermoplastic web. The web is drawn off the roll in the machine direction, with its lower layer 74 passing under the tray 62 and its upper layer 76 passing over the tray 62. The upper layer 76 is supported above the upper surfaces of the outfeed end of the conveyor and the tray at a distance which is at least equal to the height of the article to be wrapped by an upstream guide arm 78 which is mounted to the right panel 60, and a downstream guide arm 80 which is here shown as mounted to the guide 42, but which may be mounted to the guide 46. A power feed including a motor 81 is provided for the roll 16. The roll 16 rests on a pair of drive rollers, and as the web leaves the roll 16 it passes over a dancer roll which is mounted to and between a pair of downwardly spring biased arms (all not shown). When tension is applied to the free end of the web, it raises the dancer roll to trip a snap-action switch 82 to energize the roll drive motor 81 coupled to the drive rollers. When an adequate length of the web has been fed from the supply roll, the tension on the web is removed, the dancer roll falls to untrip the switch 82 to deenergize the motor. This arrangement is similar to that shown in the U.S. patent application Ser. No. 468,331 by Alfred G. Monaghan, filed June 30, 1965 and assigned to a common assignee.

The L sealer may be of the type generally shown in U.S. Patent No. 3,047,991 to Martin Siegel et al., issued Aug. 7, 1962. The sealer here shown includes a carriage 82 having a left arm 84 which is mounted at its rear end to the rear panel by a shaft 86 and is fixed at its front end to a front bar 88, and a right arm 90 which is mounted at its rear end to the rear panel by the shaft 86 and which extends as a side bar to join and to extend beyond the front bar. A front sealing bar 92 and a right side sealing bar 94 are similarly joined together with over extension, and are supported from the carriage by a plurality of rods 96. Each of the sealing bars includes clamping surfaces and electrical heating elements 176, 178 as shown in the U.S. patent application Ser No. 374,108 of Seymour Zelnick filed June 10, 1964, assignee. On L shaped back up assembly including a now Patent No. 3,299,251 and assigned to a common front back up bar 98 and a right side back up bar 100 are fixed to the top of the module 10, the upper surface of the back up assembly being level with the upper surface 62U of the tray 62. A machine direction outfeed conveyor belt assembly 102 driven by a motor 103 is disposed within the rectangle formed by the sealer, with its upper run disposed below the level of the upper surface of the L shaped back up assembly. A locator assembly 104 may be disposed within the sealer above the conveyor belt. The locator assembly includes a back member 106 which may be adjustably located with respect to the cross-web axis and the machine direction axis by a traversing carriage and arm assembly 108 which is secured to the rear panel. A left side member 110 is pivotally mounted to the left end of the back member 106 and may be swung from a back in-line position to a forward L shaped position, here shown. A pneumatic cylinder and piston assembly 112 are coupled to the left side member 110 to control its position.

A pusher assembly includes a pneumatic cylinder 114 which is fixed to the front panel and has a piston 116 which extends under the outfeed end of the cross-web axis infeed conveyor assembly; as best seen in FIGS. 5 and 6. A guide follower block 118 is fixed to the end of the piston and has two laterally extending rollers 120 which ride in channels provided by the pusher assembly guide 30. A cross arm 122 is fixed to the block 118 and extends beneath the outfeed end of the conveyor assembly over the tray 62 and carries a pusher plate 123 having an upstanding arm 124 and a horizontal arm 126. A similar, auxiliary pusher plate 128 is adjustably mounted, with respect to the cross-web axis to the plate 123 by a slotted arm 130 and thumbscrews 132.

The loading station 18 may be considered to be the rectangle defined by the back stop 69 and the pusher plates 123, 128. A snap-action switch 133 is provided to detect the delivery of an article to the loading station by the infeed conveyor. The switch has an actuator which extends below and beyond the discharge conveyor and which is tripped by the trialing edge of an article as it falls from the conveyor to the tray.

Articles may be placed either manually on the cross-web axis conveyor, or be fed onto the conveyor from an adjoining conveyor. With the conveyor running, the articles are successively advanced onto the loading tray 62. As previously mentioned, the lower layer of the folded web passes under the tray, and also the pusher plates, while the upper layer of the web passes over the tray, and also the pusher plates. Air escaping through the fine orifices of the upper surface 62U creates a pressurized zone under the upper layer of the film which serves to raise the upper layer at the web above the tray and the article and thereby permit the article being advanced by the conveyor to pass onto the loading tray and the horizontal arms of the pusher plates. As the article approaches the opening in the web, the escaping air flow is partially blocked; thereby increasing the air pressure within the web until the upper layer has risen to clear the advancing article. It will be appreciated that this arrangement raises the upper layer in a smooth, non-distorted manner, and is self compensating for the height of the article.

Figure 7:
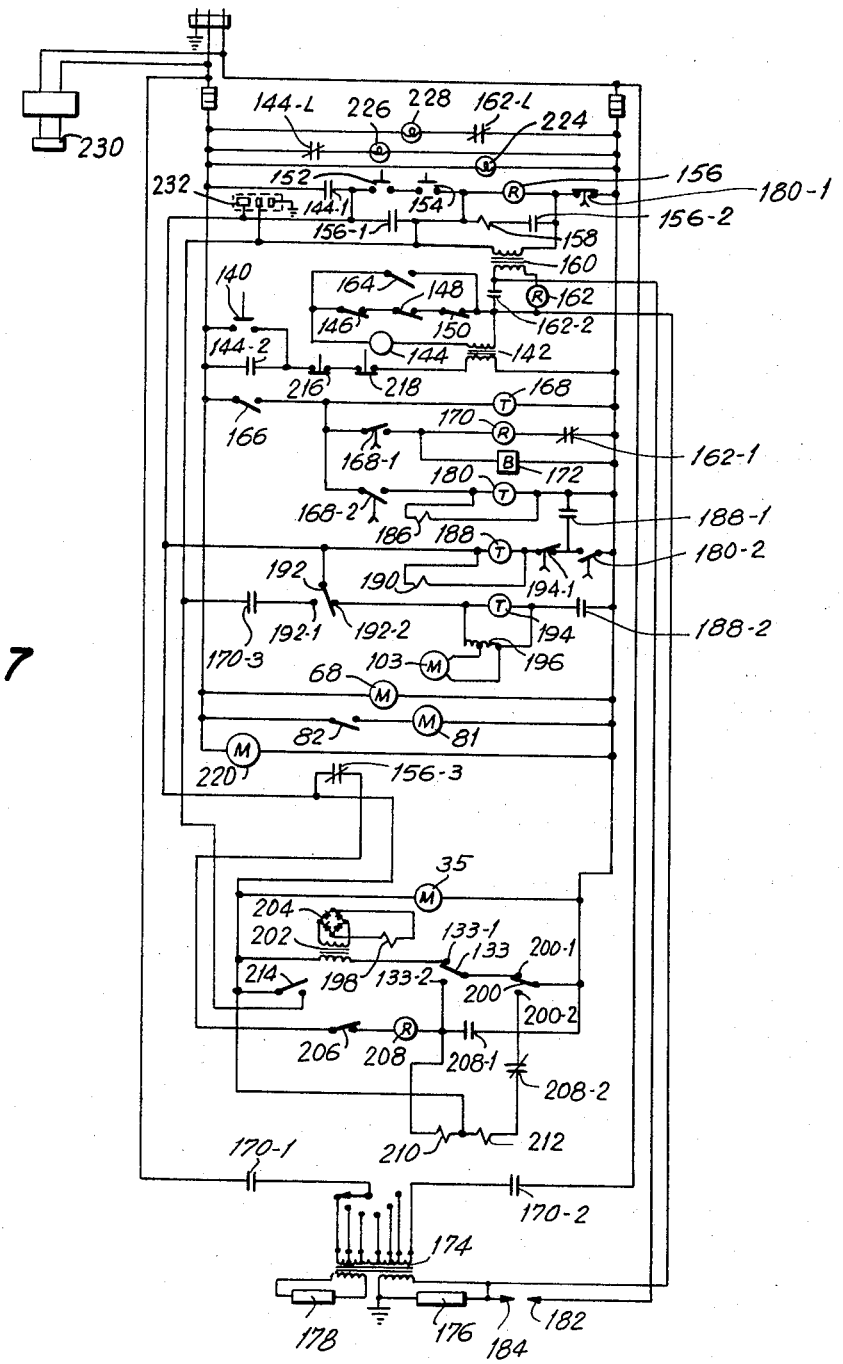
FIG. 7 is a schematic circuit diagram of electrical circuitry of the apparatus.

The description of the operation of the unit with respect to FIG. 7 will commence with the operation of the sealing station, since it is necessary to provide the folded over web with a first cross-web seal before the insertion of the first article. The folded over web is manually drawn off the supply roll 16 until its downstream end extends beyond the right sealer back-up bar 100. A reset switch 140 is manually closed, energizing the primary of a transformer 142. The secondary of the transformer 142 energizes a relay 144 through spring biased closed, normally open, snap-action safety switches 146, 148 and 150. These switches are mounted on the front and side sealer bar in a manner such that if the downward movement of a bar is resisted as the sealer carriage comes down, the spring bias on at least one switch will be overcome, the respective safety switch will open, the relay 144 will be deenergized and the sealer carriage will be raised up. The relay 144 when energized closes its normally open contacts 144–1. The two start switches 152 and 154 are manually closed to energize a relay 156 which closes its normally open contacts 156–1 and 156–2, and opens its normally closed contacts 156–3. The now closed contacts 156–1 and 156–2 energize a solenoid 158 of a solenoid operated valve which controls the operation of the pneumatic cylinder for the lowering of the carriage 84, which cylinder lowers the carriage 84; and also energizes the primary of a transformer 160 providing an energy source for a relay 162.

As the carriage 84 is lowered, before the snap-action switches 146, 148 or 150 can open, it closes a normally open snap-action switch 164 which is mounted on the carriage. When the carriage comes down fully and firmly presses against the web it closes a normally open switch 166 which energizes a heat pulse timing relay 168, and through the normally closed contacts 162-1 of the relay 162 and normally closed contacts 168-1 of the relay 168, energizes a heavy current relay 170 and a buzzer 172. The relay 170 closes its normally open contacts 170-1, 170-2 and 170-3. The closed contacts 170-1 and 170-2 energize the primary of a transformer 174, whose secondary energizes the heating elements 176 and 178 to heat and seal the web. In any event, when the timer 168 times out, it opens its normally closed contacts 168-1, which deenergize the relay 170 who contacts open, deenergizing the transformer 174 and the heaters 176 and 178, and it closes its normally open contacts 168-2 which energize a timing relay 180 and a solenoid 186. Possibly, before the timer 168 times out, a contact 182 which is fixed to the front bar 92 will be closed by a contact 184 which is carried by the end of the heater 176. The heater 176 expands with temperature, and to ensure the end of the heat pulse at a predetermined temperature which will be detected by the closing of these contacts, the relay 162 will be energized and will close its normally open contacts 162-2 and open its normally closed contacts 162-1. The closed contacts 162-2 will latch the relay 162 and the open contacts 162-1 will deenergize the relay 170, which in turn will deenergize the transformer and the heaters. This expansion sensing contact arrangement is shown in U.S. patent application Ser. No. 374,108 of Seymour Zelnick, filed June 10, 1964, now Patent No. 3,299,251 and assigned to a common assignee.

It will be appreciated that the high current through the heating elements causes a rapid heating of these elements, each of which melts a gap into the superposed layers of the web, with the superposed edges of the layers which bound the gap being welded together. The rapid heating causes an elongation of the elements, one of which is sensed by the contact arrangement of Patent No. 3,299,251 supra. When the element reaches a preset temperature, as indicated by its elongation, the contact arrangement overrides the times and terminates the current pulse.

The solenoid 186 is part of a solenoid operated valve coupled to a supply of air under pressure and containing a silicone oil mist. When the solenoid is energized it forces an air-oil mist through the sealing bars to rapidly cool the sealed layers of the web, as shown in the U.S. patent application Ser. No. 555,903, of Kelvin G. Anderson, filed June 7, 1966, and assigned to a common assignee. When the cooling timer 180 times out, it first opens its normally closed contacts 180-1 which deenergize the relay 156 and the solenoid 158 to raise the carriage; and then closes its normally open contacts 180-2 which energize a relay 188 and a solenoid 190. The relay 188 closes its normally open contacts 188-1 and 188-2. As the carriage rises, after a mechanical delay, the carriage down sensing switch 166 opens; and an additional carriage down sensing switch 192 moves from its down contact 192-1 to its up contact 192-2. It will be appreciated that the oil-mist spray continues as the carriage rises, so that the oil will coat the heater elements to function as a release agent on the next successive sealing operation. The solenoid 190 is part of a solenoid operated valve coupled to the pneumatic cylinder 112 which acts to swing the guide left side member in line with the guide back member. When the switch 192 is at its carriage up contact 192-2, and contacts 188-2 are closed, a timer 194, an autotransformer 196 and the motor 103 are energized to advance the outfeed conveyor 102 in the machine direction to remove the web sealed article from the sealing station.

When the conveyor timer 194 times out, it opens its normally closed contacts 194-1, which deenergize the relay 188, which opens its contacts 188-1 and 188-2 to deenergize and reset the timers 180 and 194 and to deenergize the motor 103, halting the outfeed conveyor. While the motor 103 has been shown as being deenergized to halt the conveyor, it will be appreciated that a declutching arrangement, as will be described with respect to the infeed conveyor motor 35, may be utilized.

The infeed conveyor is driven by the continuously energized (when relay 144 is energized) motor 35 through a clutch, not shown, which is energized when a solenoid 198 is energized. A pusher return detecting switch 200 is closed to its contact 200-1 by the pusher when the pusher plate is in its upstream position, ready to receive an article from the infeed conveyor. The article detecting switch 133 is normally closed to its contact 133-1 in the absence of an article from the loading tray. When the contacts 200-1 and 133-1 are closed, a transformer 202, a rectifier 204 and the solenoid 198 are energized, advancing the infeed conveyor. When the trailing edge of an article falls off the outfeed end of the infeed conveyor it shifts the switch 133 to close its 133-2 contact, the transformer 202 is deenergized and the infeed conveyor is halted. An additional carriage down sensing switch 206 is normally closed, but is open when the carriage is down. The contacts 156-3 are normally closed in the absence of a carriage down cycle. When the contacts 156-3 are closed, the switch 206 is closed indicating the carriage is up; the switch 133 is closed to its contact 133-2 indicating an article is on the loading tray, and the switch 200 is closed to its contact 200-1 indicating the pusher is upstream, a relay 208 is energized, closing its normally open contact, 208-1 and opening its normally closed contacts 208-2 to energize a solenoid 210. The solenoid 210 is part of one of two solenoid valves coupled to the pusher cylinder 114, a solenoid 212 being part of the other valve. When the solenoid 210 is energized it acts to cause the pusher piston to retract into its cylinder, advancing the article from the loading station to the sealing station. As the article pulls the web along with it, the web trips the switch 42 to energize the motor 81 to feed the web off the supply roll. As the pusher leaves its upstream position it releases the switch 200 which closes to its contact 200-2. When the pusher arrives at its downstream position, delivering the article to the sealing station, it closes a pusher return switch 214. This switch 214 provides a shunt path across the normally open, manually operable start switches 152 and 154, which energizes the relay 156 to start a sealing cycle. When energized, the relay 156 also opens its contacts 156-3 which deenergizes the relay 208, which closes its contacts 208-2 to energize the solenoid 212. The solenoid 212 acts to cause the cylinder 114 to return the pusher up-stream to the loading position before the carriage is lowered all the way.

The operation of the sealer may be halted at any time by opening either of the stop switches 216 and 218. A motor 220 is continually energized and is coupled to a blower, not shown, to provide a suction at an elongated aperture 222 which removes scrap web formed by the cutting operation of the front sealer bar 92. An indicator light 224 may be provided to indicate that power is supplied to the sealer. An indicator light 226 in series with a normally closed contact 144-L may be provided to indicate that the relay 144 is energized, and that the reset switch 140 has been operated to commence operations. An indicator light 228 in series with a normally closed contact 162-L may be provided to indicate that the relay 162 is energized indicating the end of a heating cycle. A small hole burner 230 may be mounted to the carriage to burn a small hole through the web to permit the release of air trapped in the web when it is sealed. A foot switch 232 may be provided to shunt the switch 214 to permit operator control of the sealing operation if the loading station is not utilized.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for packaging articles in a folded over web comprising: a loading tray having a rear edge; means for supplying a longitudinally extending, folded over web having a lower layer disposed below said tray and an upper layer disposed above said tray with the fold adjacent said rear edge of said tray; means for supplying a flow of gas upwardly from the upper surface of said tray against the upper layer of the web; a back stop means disopsed adjacent said rear edge of said tray; the fold of the web being guided between said rear edge of said tray and said back stop means; and pusher means having a portion disposed over said upper surface of said tray and below the upper layer of the web for movement across said tray along a path substantially parallel to said rear edge of said tray.

2. Apparatus according to claim 1 further including: sealing means for sealing the upper layer of the web to the lower layer of the web along the cross-axis of the web.

3. Apparatus according to claim 2 wherein; said gas supply means includes a plurality of fine orifices disposed in said upper surface of said tray and a source of positive gas flow coupled to said orifices.

4. Apparatus according to claim 3 wherein; said tray includes an internal cavity which couples said orifices to said source of positive gas flow.

5. Apparatus according to claim 2 including: two spaced apart guide means disposed above said upper surface of said tray for supporting at least a marginal portion of the upper layer of the web at a distance above said upper surface of said tray.

6. Apparatus according to claim 5 further including means for advancing an article onto said upper surface of said tray below the upper layer of the web towards and up to said back stop means.

7. Apparatus according to claim 6 further including projection means disposed downstream of said tray and said sealing means; said pusher means being adapted to abut the upstream edge of an article disposed within the web to advance the article into engagement with the seal along the cross-axis of the web to transport the article and the adjacent portion of the web downstream from said tray beyond said sealing means and said projection means, whereby said projection means is adapted to abut the upstream edge of the article and to preclude retrograde movement of the article therebeyond upstream.

8. Apparatus according to claim 6 further including three spaced apart guides disposed above said means for advancing an article onto said tray for guiding such an article, two of said guides being relatively close above said advancing means, the third of said guides being disposed between the other two and being spaced above said advancing means, whereby relatively low articles are guided between said two guides and under said third guide and relatively high articles are guided between one of said two guides and said third guide.

References Cited

UNITED STATES PATENTS

| 2,947,127 | 8/1960 | Herman | 53—182 |
| 3,233,527 | 2/1966 | Membrino | 53—385 X |

THERON E. CONDON, *Primary Examiner.*

E. F. DESMOND, *Assistant Examiner.*

U.S. Cl. X.R.

55—385